A. C. McLEARY.
PLOW-FENDERS.

No. 183,952. Patented Oct. 31, 1876.

WITNESSES:
Francis McArdle
John Goethals

INVENTOR
A. C. McLeary
BY
Munn & Co.
ATTORNEYS

UNITED STATES PATENT OFFICE.

ANDREW C. McLEARY, OF HUMBOLDT, TENNESSEE, ASSIGNOR OF ONE-HALF HIS RIGHT TO JAMES H. HAMON AND SAMUEL M. McLEARY, OF SAME PLACE.

IMPROVEMENT IN PLOW-FENDERS.

Specification forming part of Letters Patent No. 183,952, dated October 31, 1876; application filed September 2, 1876.

*To all whom it may concern:*

Figure 1:
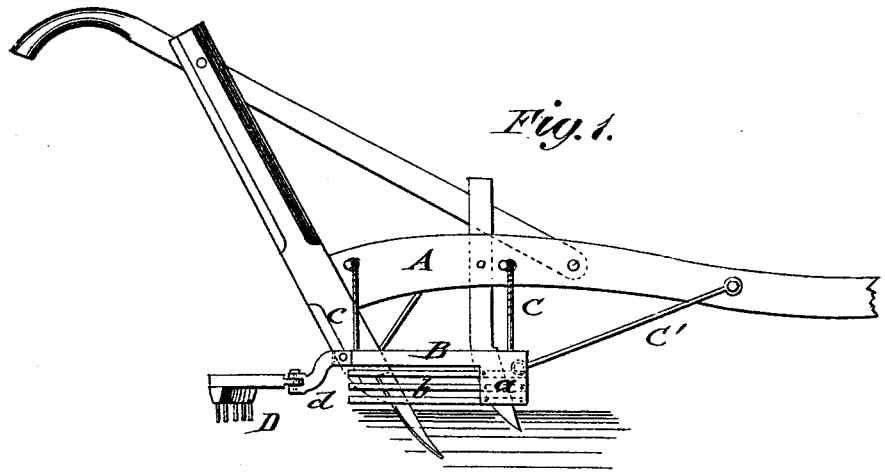
Figure 2:
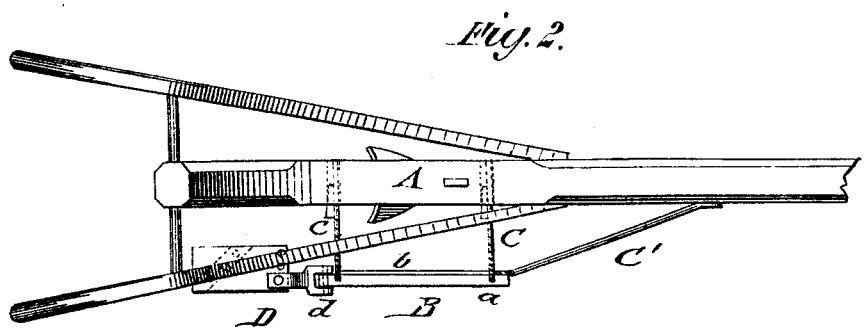

Be it known that I, ANDREW C. MCLEARY, of Humboldt, county of Gibson, and State of Tennessee, have invented a new and Improved Plow-Fender, of which the following is a specification:

In the accompanying drawing, Figure 1 represents a side elevation of a plow with my improved fender attachment, and Fig. 2 is a top view of the same.

Similar letters of reference indicate corresponding parts.

The invention relates to a plow with an improved fender attachment, by which the plowing of young corn, cotton, &c., may be accomplished in quicker and more perfect manner without stopping to uncover and take off clods from the young plants. The clods and irregular lumps of earth are carried back into the furrow, so that the young plants receive a deep plowing and a good cleaning.

The invention consists of a fender-piece secured by curved rods and braces to the plow-stock, and of a swinging and adjustable harrow applied to the fender-piece.

In the drawing, A represents the plow-beam, and B the fender-piece, that is rigidly secured by curved rods C and suitable braces C' to the beam.

The fender B may be adjusted to the proper height and distance from the plow-beam by means of screw-nuts, wedges, or otherwise.

The fender B is made of a piece of wood, $a$, with thin iron slats $b$, fastened to the main piece $a$ at the front end only, leaving the rear ends free to give, so that large clods may readily pass without choking the plow. The fender passes close to the young plants and protects them against injury from heavy clods, which are conducted back into the plow-furrow. It admits the effective plowing around the plants, and the covering up of young grass and weeds, without, however, laying bare the plants.

To the rear end of the fender-piece is applied, by a curved and horizontally-swinging arm, $d$, a small harrow, D, whose teeth are arranged at suitable inclination toward the direction of plowing. The harrow D is adjusted by perforations and clamp-bolts to the recessed supporting-arm in such a manner as to run closer or farther from the young plants, and draw thereby the fine dirt around the same, and remove the clods from the drill.

A plow with this fender attachment accomplishes a larger amount of work than the common plow, and in a more reliable and satisfactory manner, so that very little extra work for scraping and hoeing in cotton and other plants is required.

Having thus described my invention, I claim as new and desire to secure by Letters Patent—

The combination, with the fender attachment B of a plow, of a harrow, D, attached in adjustable manner to a curved and pivoted arm, $d$, of the fender, substantially as shown and described.

ANDREW CURRY McLEARY.

Witnesses:
   M. T. COX,
   S. D. WADDILL.